US005590003A

United States Patent [19]
Dunfield et al.

[11] Patent Number: 5,590,003
[45] Date of Patent: Dec. 31, 1996

[54] HYDRODYNAMIC SPINDLE MOTOR HAVING DISTRIBUTED WINDINGS

[75] Inventors: John C. Dunfield, Santa Cruz; Gunter K. Heine, Aptos, both of Calif.

[73] Assignee: Seagate Technology, Inc., Scotts Valley, Calif.

[21] Appl. No.: 400,661

[22] Filed: Mar. 8, 1995

[51] Int. Cl.$^6$ ............................ G11B 17/02; H02K 3/00; F16C 32/06

[52] U.S. Cl. .................... 360/98.07; 360/99.08; 310/179; 310/261; 384/100

[58] Field of Search ........................ 360/97.01, 98.01, 360/98.07, 99.04, 99.08, 99.09, 99.11; 310/67 R, 156, 162, 254, 261, 179, 184; 318/254, 701; 384/100, 112, 113

[56] References Cited

U.S. PATENT DOCUMENTS

| | | | |
|---|---|---|---|
| 3,678,352 | 7/1972 | Bedford | 318/138 |
| 4,933,585 | 6/1990 | Rossi | 310/162 |
| 4,940,912 | 7/1990 | Kant et al. | 310/162 |
| 4,965,476 | 10/1990 | Lin | 310/51 |
| 5,006,745 | 4/1991 | Nishio et al. | 310/179 |
| 5,030,864 | 7/1991 | Van Hout et al. | 310/179 |
| 5,112,141 | 5/1992 | Asada et al. | 384/100 |
| 5,127,744 | 7/1992 | White et al. | 384/112 |
| 5,164,622 | 11/1992 | Kordik | 310/67 R |
| 5,173,651 | 12/1992 | Buckley et al. | 318/701 |
| 5,215,385 | 6/1993 | Ide | 384/100 |
| 5,328,270 | 7/1994 | Crawford et al. | 384/100 |
| 5,355,043 | 10/1994 | Kaneda | 310/156 |
| 5,376,850 | 12/1994 | Elsing et al. | 310/67 R |
| 5,376,851 | 12/1994 | Lipo et al. | 310/179 |
| 5,376,852 | 12/1994 | Kawamura et al. | 310/198 |
| 5,423,612 | 6/1995 | Zang et al. | 384/119 |
| 5,446,610 | 8/1995 | Elsaesser et al. | 360/98.07 |
| 5,457,588 | 10/1995 | Hattori et al. | 360/98.07 |
| 5,459,005 | 11/1995 | Asama et al. | 310/254 |
| 5,500,780 | 3/1996 | Boutaghou et al. | 360/98.07 |
| 5,508,571 | 4/1996 | Shafer, Jr. | 310/179 |
| 5,510,663 | 4/1996 | Van Loenen | 310/179 |

FOREIGN PATENT DOCUMENTS

| | | | |
|---|---|---|---|
| 2906862 | 9/1979 | Germany | 310/179 |
| 5-316677 | 11/1993 | Japan | 310/254 |
| 1636932 | 3/1991 | U.S.S.R. | 310/179 |

OTHER PUBLICATIONS

*DC Motors Speed Controls Servo Systems*, "Brushless DC Motors", Electro–Craft Corporation, Hopkins, MN, Chapter 6, pp. 6–5–6–17 (1972) Oct. 1972.

C. Veinott, *Theory and Design of Small Induction Motors*, "Air–Gap MMF and Flux Waves Set Up By A Single–Phase Winding", published by McGraw–Hill Company, Inc., New York, Chapter 14, pp. 265–281 (1959).

C. Veinott, *Theory and Design of Small Induction Motors*, "Air–Gap MMF Waves Set Up By A Stator Winding", published by McGraw–Hill Company, Inc., New York, Chapter 15, pp. 282–290 (1959).

A. E. Fitzgerald, C. Kingsley, Jr. and S. Umans, *Fourth Edition—Electric Machinery*, "Rotating Machines: Basic Concepts", published by McGraw–Hill Company, Inc., New York, pp. 133–135 (1983).

(List continued on next page.)

*Primary Examiner*—Jefferson Evans
*Attorney, Agent, or Firm*—Westman, Champlin & Kelly, P.A.

[57] ABSTRACT

A hydrodynamic bearing spindle motor for rotating at least one disc about a central axis in a data storage device comprises a base, a stationary member, a hub, and a stator. A hydrodynamic bearing interconnects the hub with the stationary member such that the hub is rotatable about the central axis. The stator is coaxial with the hub and has at least one stator winding that is distributed about its circumference. The distributed winding attenuates pure tone vibrations which become more noticeable with lower levels of background vibrations in hydrodynamic bearing spindle motors.

15 Claims, 7 Drawing Sheets

OTHER PUBLICATIONS

T. H. Barton, J. C. Dunfield, *IEEE Transactions on Power Apparatus and Systems*, "Inductances of a Practical Slip-Ring Primitive", IEEE, vol. PAS-85/No. 2, pp. 140-159 (1966) Feb. 1966.

J. C. Dunfield, T. H. Barton, *Proceedings of The Institution of Electrical Engineers*, "Effect of m.m.f. and permeance harmonics in electrical machines—with special reference to a synchronous machine", The Inst. of Elect. Eng., Savoy Place, London WC2, vol. 114, No. 10, pp. 1443-1450 (1967) Oct. 1967.

S. Prina and C. Taft, "The Design and Analysis of Brushless DC Motors Having Smooth Rotor Back Iron," *1992 Symposium of Incremental Motion Control Systems Society*, published by Incremental Motion Control Systems Society, P.O. Box 2772, Station A, Champaign, IL 61825, B. C. Kuo editor, pp. 75-100 (1992).

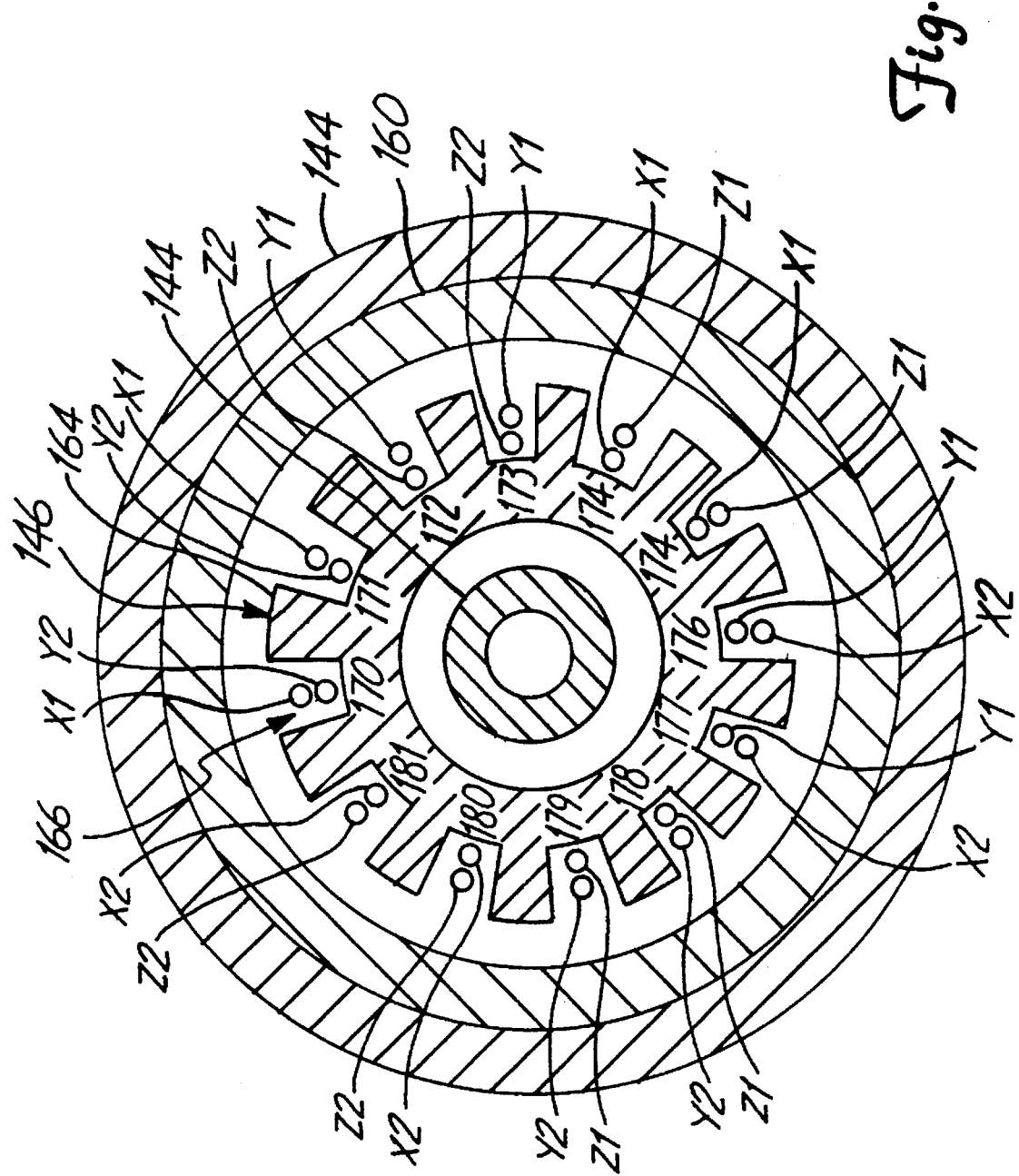

10
HYDRODYNAMIC SPINDLE MOTOR HAVING DISTRIBUTED WINDINGS

BACKGROUND OF THE INVENTION

The present invention relates generally to the field of spindle motors for disc drive data storage devices and, more particularly, to a hydrodynamic spindle motor having distributed windings.

Disc drive data storage devices, known as "Winchester" type disc drives, are well-known in the industry. In a Winchester disc drive, digital data are written to and read from a thin layer of magnetizable material on the surface of rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting hydrodynamic air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor.

The first Winchester disc drives to be produced were large cabinet models which included discs having a diameter of 14 inches and AC induction spindle motors. These types of disc drives were commonly located in dedicated "computer rooms" with large mainframe computers, where environmental factors such as temperature and humidity could be carefully controlled. In this type of environment, the acoustic noise generated by cooling fans and disc drive motors was of little concern, since the only persons directly in contact with the systems were maintenance personnel, who were generally not in the computer rooms for extended periods of time. The users of such systems were typically located at a remote location and communicated with the computer system via keyboards and display terminals which did not generate excessive amounts of acoustic noise.

More recently, personal computers have become more popular and are commonly located within the work space of the system user. This has prompted an increase in awareness of acoustic noise generated by the disc drives located within the personal computers. In certain markets, such as Europe, the amount of acoustic noise allowable in the work place is closely regulated. With this in mind, it has become common for system manufacturers to impose a "noise budget" on manufacturers of major system components, such as disc drives, which limits the amount of acoustic noise that such components can contribute to the overall noise of the system.

One of the principal sources of noise in disc drive data storage devices is the spindle motor which drives the discs at a constant speed. Typical spindle motor speeds have been in the range of 3600 RPM. Current technology has increased spindle motor speeds to 4800 RPM, 7200 RPM and above. Analysis of various types of disc drives has brought to light several different modes of acoustic noise generation which are attributable to the spindle motor and its control logic.

One mode of noise generation is radial and axial vibrations in the stator and in the rotor. These vibrations are caused by electromagnetic disturbances generated during the excitation of the stator mass by the application and removal of the commutation pulses that are used to drive the motor and control its speed. The commutation pulses are timed, polarization-selected DC current pulses which are directed to sequentially selected stator windings. Any rapid rise and fall times of these pulses act as a striking force and set up sympathetic vibrations in the stator and rotor which generate resonant vibrations in the housing causing unacceptable levels of acoustic noise.

Prior art attempts to reduce or eliminate noise include controlling the resonant frequency of the housing, damping the vibration of the housing, resin bonding the stator to the base, and centering the stator axially and radially with respect to the rotor magnet. In U.S. Pat. No. 5,376,850, acoustic noise is reduced by uncoupling the stator from hard contact with the stationary portion of the shaft.

Disc drive manufacturers have recently begun looking at replacing conventional ball bearings in spindle motors with hydrodynamic bearings. Hydrodynamic bearings are much quieter and in general have lower vibrations than conventional ball bearings. However, more complete solutions are desired to further reduce acoustic and vibration levels in disc drive spindle motors.

SUMMARY OF THE INVENTION

The present invention is a hydrodynamic bearing spindle motor for rotating at least one disc about a central axis in a data storage device. The motor comprises a base, a stationary member, a hub, and a stator. A hydrodynamic bearing interconnects the hub with the stationary member such that the hub is rotatable about the central axis. The stator is coaxial with the hub and has at least one stator winding that is distributed about its circumference.

In one embodiment, the stator winding is a three-phase winding. The windings in each phase are wound on the stator between selected stator slots to form the overall stator winding. The stator preferably has a large number of slots to allow the windings in each phase to be finely distributed among adjacent slots. In addition, the windings in each phase preferably have a pitch of about 120 electrical degrees along the stator circumference.

It has been found through experiment that pure tone vibrations become more noticeable in hydrodynamic bearing spindle motors since the background vibration level is lower than in spindle motors having ball bearings. The pure tone vibrations are therefore no longer hidden in the background in hydrodynamic motors. The distribution and pitch of the windings in the present invention provide a more complete solution to reducing the forcing functions that give rise to the pure tone vibrations in hydrodynamic motors than do the solutions attempted in the prior art.

BRIEF DESCRIPTION OF THE DRAWINGS

FIG. 7 is a schematic sectional view of the alternative stator arrangement shown in FIG. 6.

DETAILED DESCRIPTION OF THE PREFERRED EMBODIMENTS

Figure 1:
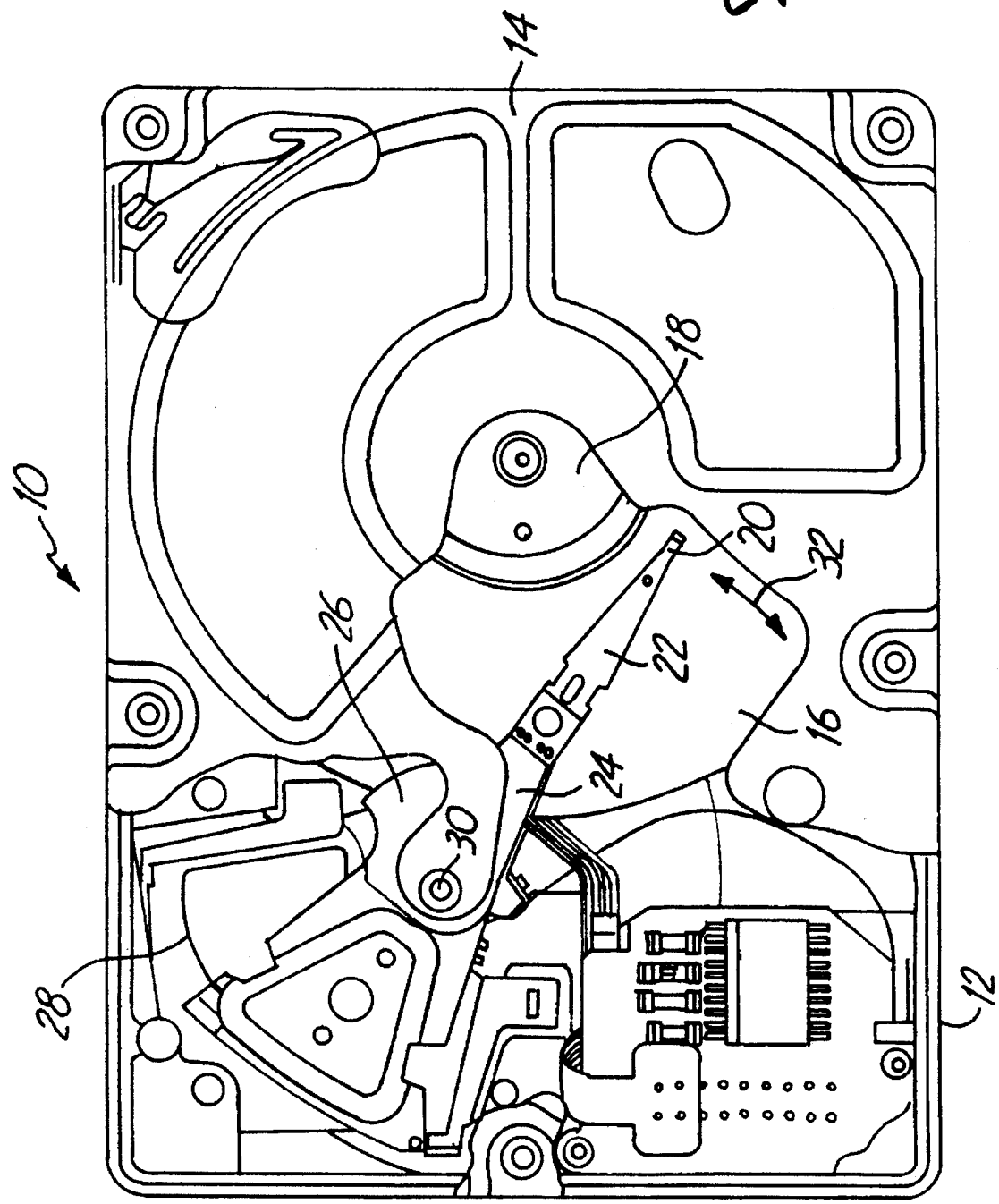
FIG. 1 is a top plan view of a disc drive data storage device, in accordance with the present invention.

The present invention is a hydrodynamic motor for a disc drive data storage device in which the stator windings are distributed and pitched to reduce acoustic and vibration levels in the storage device. FIG. 1 is a plan view of a typical disc drive 10 in which the present invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the present invention is not limited to the configuration of the disc drive housing. For example, disc drives have been manufactured using a vertical split between two housing members. In such drives, that portion of the housing half which connects to the lower end of the spindle motor is analogous to base 12, while the opposite side of the same housing member, which is connected to or adjacent the top of the spindle motor, is functionally the same as the top cover 14.

Disc drive 10 further includes a disc pack 16 which is mounted for rotation on a spindle motor (not shown) by a disc clamp 18. Disc pack 16 includes a plurality of individual discs which are mounted for co-rotation about a central axis. Each disc surface has an associated head 20 which is mounted to disc drive 10 for communicating with the disc surface. In the example shown in FIG. 1, heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the present invention is also useful in disc drives having other types of actuators, such as linear actuators.

Figure 2:
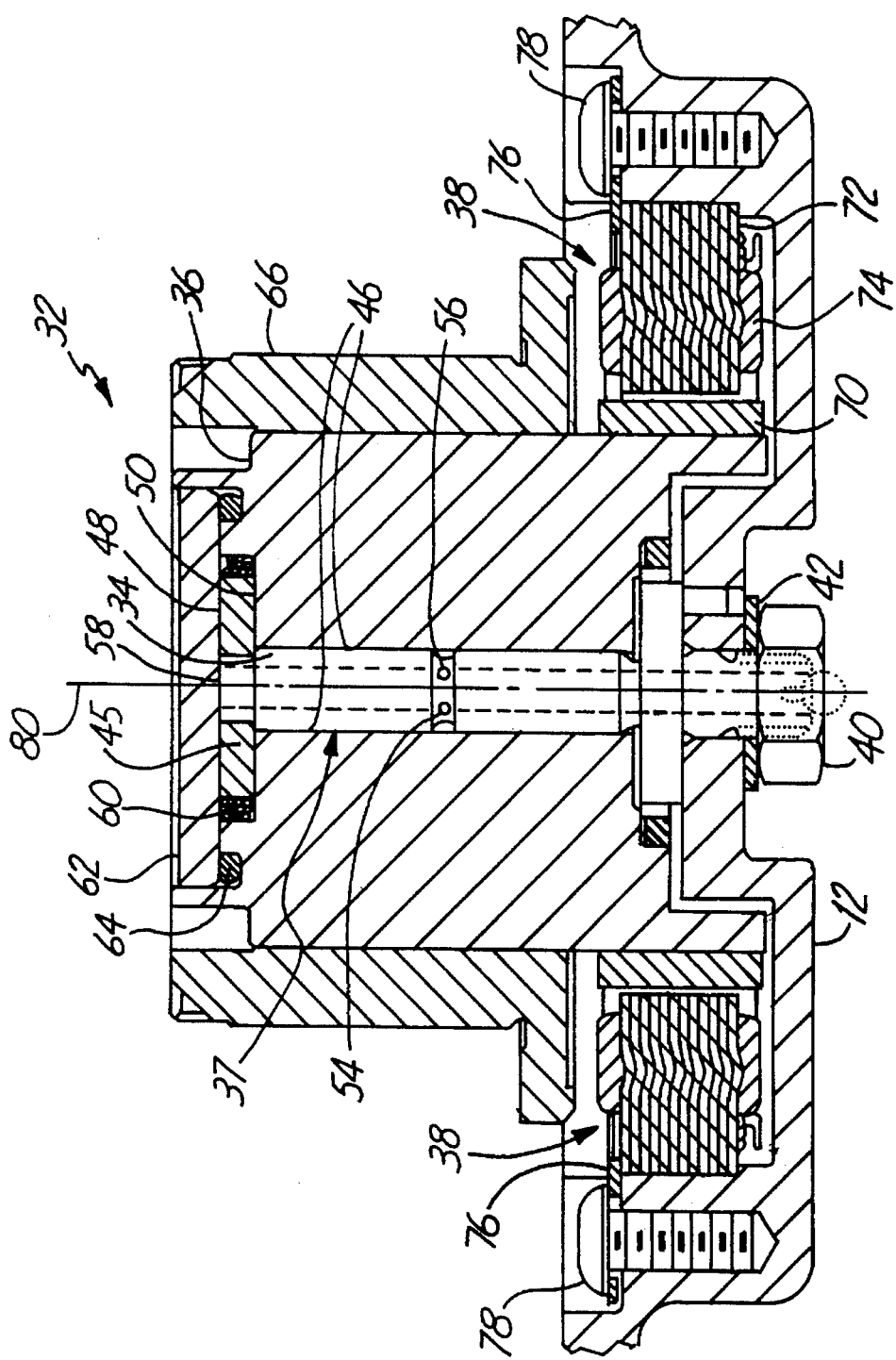
FIG. 2 is a sectional view of a hydrodynamic bearing spindle motor in accordance with the present invention.

FIG. 2 is a sectional view of a hydrodynamic bearing spindle motor 32 in accordance with the present invention. Spindle motor 32 includes a stationary member 34, a hub 36 and a stator 38. In the embodiment shown in FIG. 2, the stationary member is a shaft which is fixed and attached to base 12 through a nut 40 and a washer 42. Hub 36 is interconnected with shaft 34 through a hydrodynamic bearing 37 for rotation about shaft 34. Bearing 37 includes a radial working surface 46 and axial working surfaces 48 and 50. Shaft 34 includes fluid ports 54, 56 and 58 which supply hydrodynamic fluid 60 and assist in circulating the fluid along the working surfaces of the bearing. Hydrodynamic fluid 60 is supplied to shaft 34 by a fluid source (not shown) which is coupled to the interior of shaft 34 in a known manner.

Spindle motor 32 further includes a thrust bearing 45 which forms the axial working surfaces 48 and 50 of hydrodynamic bearing 37. A counterplate 62 bears against working surface 48 to provide axial stability for the hydrodynamic bearing and to position hub 36 within spindle motor 32. An 0-ring 64 is provided between counterplate 62 and hub 36 to seal the hydrodynamic bearing. The seal prevents hydrodynamic fluid 60 from escaping between counterplate 62 and hub 36.

Hub 36 includes a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32. Rotor magnet 70 can include a single, unitary magnet or can include a plurality of individual magnets spaced about the periphery of hub 36 to form one or more magnetic poles.

Stator 38 is attached to base 12 and is formed of a stack of stator laminations 72 and associated stator windings 74. The embodiment shown in FIG. 2 includes twelve stator laminations. However, stator 38 can include any other suitable number of laminations, such as six laminations. Stator 38 is attached to base 12 through a known method such as one or more C-clamps 76 which are secured to the base through bolts 78.

Stator 38 is coaxial with and external to hub 36. In the embodiment shown in FIG. 2, the spindle motor is a "below-hub" type motor in which stator 38 is positioned below hub 36. Commutation pulses applied to stator windings 74 generate a rotating magnetic field which communicates with rotor magnet 70 and causes hub 36 to rotate about a central axis 80 on bearing 37.

Figure 3:
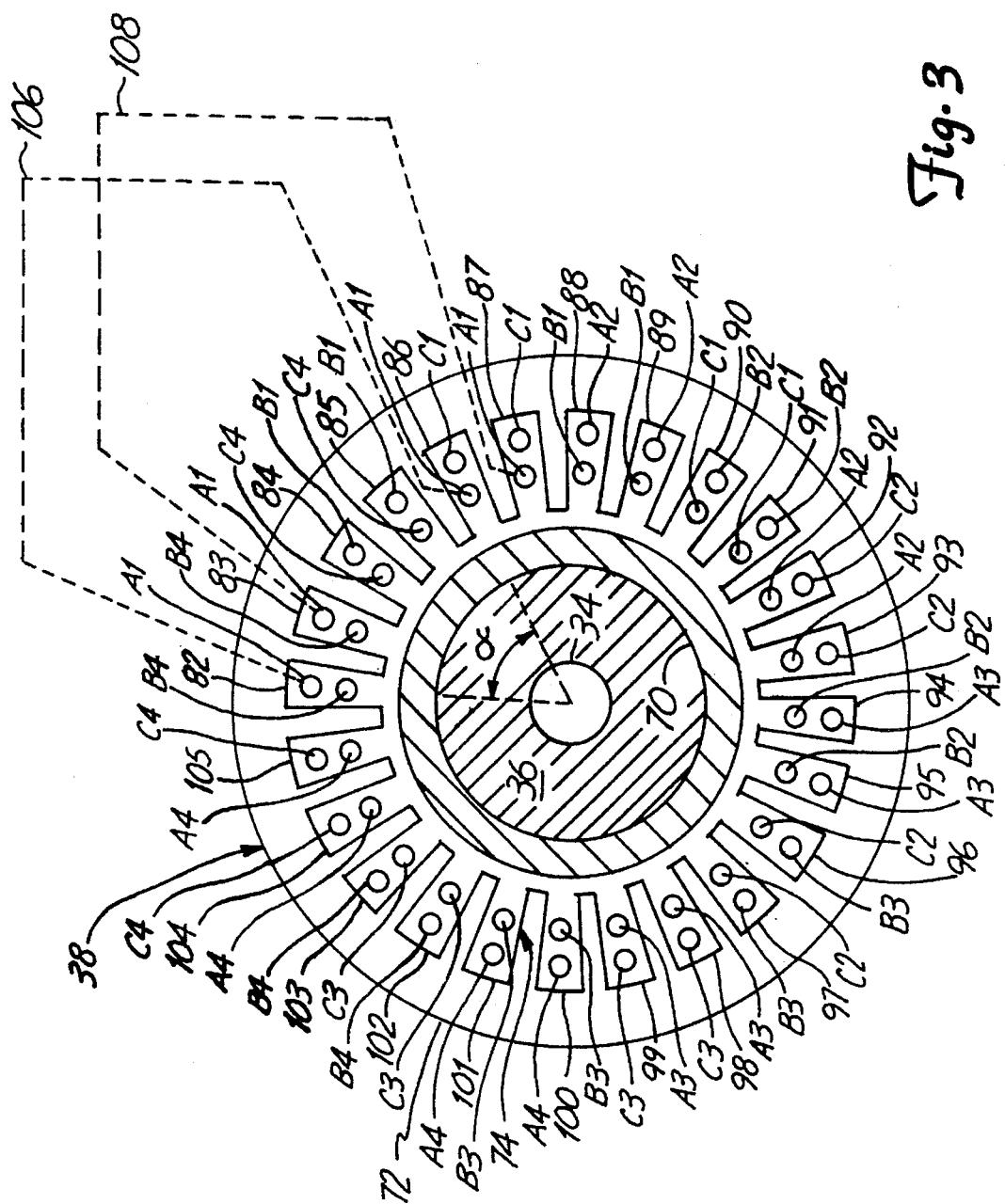
FIG. 3 is a schematic sectional view of an external stator in the hydrodynamic bearing spindle motor, in accordance with the present invention.

FIG. 3 is a schematic sectional view of stator 38 and rotor magnet 70. Stator 38 has four poles and includes twenty-four slots, labeled 82-105. Stator winding 74 has three phases, A, B and C. Each phase includes one or more phase windings. Phase A includes phase windings A1, A2, A3 and A4. Phase B includes phase windings B1, B2, B3 and B4. Phase C includes phase windings C1, C2, C3 and C4. The windings in each phase are electrically connected to one another in series or in parallel to form the complete phase winding.

Each phase winding includes a selected number of turns or coils which are wound on stator 38 between non-adjacent slots, as opposed to being wound around a particular tooth as in disc drive spindle motors of the prior art. For example, phase winding A1 includes turns that are wound on stator 38 between slot 82 and slot 86, as shown schematically by dashed line 106. Phase winding A1 also includes turns that are wound on stator 38 between slot 83 and slot 87, as shown schematically by dashed line 108. The remaining phase windings are wound on stator 38 similar to phase winding A1. Stator laminations 72 operate as a back iron for the phase windings to focus the electromagnetic field.

Phase winding A1 has a pitch α along the circumference of stator 38 of about 120 electrical degrees (⅔ pitch). Electrical degrees is defined as the number of pole pairs (two in a four pole motor) multiplied by the mechanical degrees of pitch (60 degrees for the twenty-four slot stator shown in FIG. 3). The phase windings can have various electrical degrees of pitch which can range from greater than zero degrees to a full pitch of about 180 degrees. However, a 180 degree pitch is not as effective because of space constraints, as the end turns of each coil build on one another. Pitch can be defined by a pitch factor $k_p$ (sometimes called a chord factor), where:

$$k_p = \frac{\text{amplitude of } mmf \text{ wave of a pitched turn}}{\text{amplitude of } mmf \text{ wave of a full pitched turn}}$$

Each phase winding includes a plurality of interconnected turns that are distributed or spread among one or more adjacent slots. For example, phase winding A1 is distributed between slots 82 and 83 and between slots 86 and 87. Each slot in stator 38 preferably includes turns of more than one phase. Because of the pitch and distribution of each phase winding, there are, in general, turns of at least two of the phases in each slot. For example, slot 82 includes turns of phase winding A1 and turns of phase winding B4.

The magnetomotive force (mmf) waves for a group of turns in a single phase winding is determined by taking into account the space displacement between the turns. The mmf waves for the turns are represented by vectors, with the total mmf wave being the sum of the vectors. The distribution of the turns on stator 38 can be defined by a distribution factor $k_d$ (sometimes called a breadth factor), where:

$$k_d = \frac{\text{amplitude of resultant } mmf \text{ of a phase winding}}{\text{arithmatic sum of the } mmfs \text{ of the turns in the phase winding}}$$

The pitch and distribution factors are discussed in greater detail in Co Veinott, *Theory and Design of Small Induction Motors* 265–90 (1959), which is hereby incorporated by reference. The pitch and distribution of each phase winding naturally attenuates magnetic flux harmonics induced in the stator windings, resulting in lower pure tone excitation in a hydrodynamic spindle motor. This also results in smoother torque performance.

Figure 4:
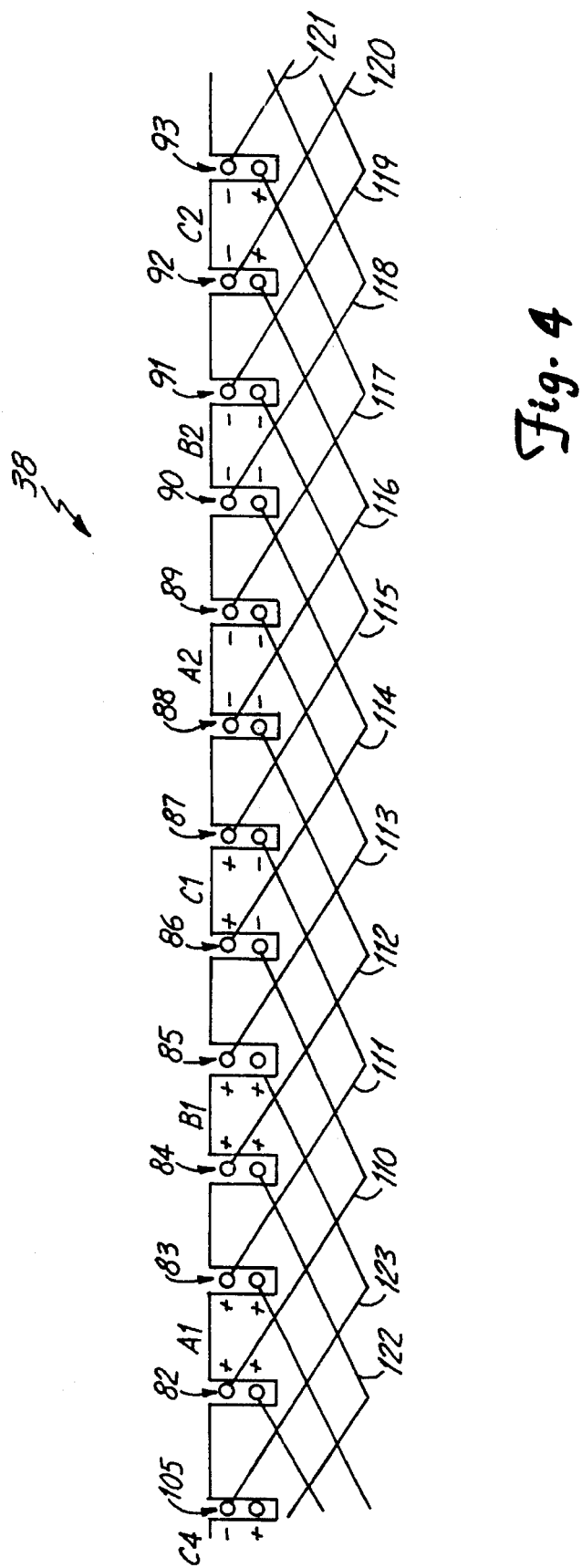
FIG. 4 is linear diagram of the external stator shown in FIG. 3.

FIG. 4 is a linear diagram of stator 38 as the stator would look if it was laid out flat. For simplicity, FIG. 4 shows the turns for only twelve of the twenty-four slots. The winding pattern is repeated for the turns of the remaining slots.

Phase winding A1 includes a plurality of turns 110 and 111 which are distributed about slots 82 and 83, and about slots 86 and 87. The "+" and "−" symbols adjacent the slots indicate current direction into and out of the page, respectively. Phase winding B1 includes a plurality of turns 112 and 113 which are distributed about slots 84 and 85, and about slots 88 and 89. Phase winding C1 includes a plurality of turns 114 and 115 which are distributed about slots 86 and 87, and about slots 90 and 91. Phase winding A2 includes a plurality of turns 116 and 117 which are distributed about slots 88 and 89, and about slots 92 and 93. Phase winding B2 includes a plurality of turns 118 and 119 which are distributed about slots 90 and 91, and about slots 82 and 83. Phase winding C2 includes a plurality of turns 120 and 121 which are distributed about slots 92 and 93, and about slots 84 and 85. A portion of phase winding C4 is shown on the left and includes a plurality turns 122 and 123 which are distributed about slots 104 and 105. Each group of turns can be performed into loops which are dropped into the respective slots, with a single wire interconnecting the loops to form a complete phase winding.

Although a twenty-four slot stator was shown in FIGS. 3 and 4, stator 38 can include other suitable numbers of slots. Examples of the number of suitable slots compared to the number of poles in the rotor magnet are shown in Table 1, based on a three-phase application with a distributed stator winding and an integer number of turns per group.

TABLE 1

| Number of Poles | Number of Slots | | | | | | |
|---|---|---|---|---|---|---|---|
| 2 | 6 | 12 | 18 | 24 | 30 | 36 | 42 | 48 |
| 4 | | 12 | | 24 | | 36 | | 48 |
| 6 | | | 18 | | | 36 | | |
| 8 | | | | 24 | | | | 48 |

In a preferred embodiment, the stator includes a high number of slots. For example, an eight-pole motor would preferably have 48 slots. With a high number of slots, there is a lower number of discontinuities in the magnetomotive force since the turns in each phase winding can be more finely distributed among adjacent slots. Although a higher number of slots is preferred, there is a practical limit to the number of slots in a particular application. The number of slots is limited by the wire size, the number of turns in the windings, and the practicalities of winding the turns onto the stator. These limits are balanced against the desire to increase the number of slots.

Increasing the number of slots also causes a decrease in reluctance variation. As a result, the electromagnetic disturbances are at a much higher frequency and therefore have a less significant effect on the axial and radial vibrations in the stator and rotor.

Figure 5:
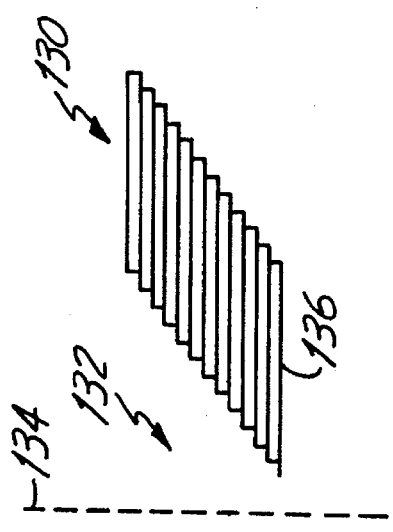
FIG. 5 is a fragmentary side plan view of a stator having a slot which is angled with respect to its central axis.

The reluctance variations can be smoothed further by orienting the slots (and thus the turns in the slots) at skew with respect to the central axis. FIG. 5 is a fragmentary side plan view of a stator 130 having a slot 132 which is angled with respect to central axis 134. Slot 132 is angled by rotating each stator lamination 136 an incremental angle about central axis 134 from the preceding lamination in the stack. In preferred embodiments, laminations 136 are skewed so that the lamination on the top of the stack has an angular rotation that is between zero and one slot pitch with respect to the lamination on the bottom of the stack.

Figure 5A:
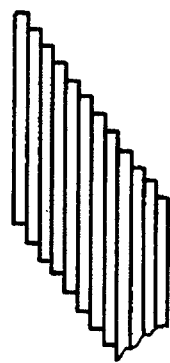
FIG. 5a is a-fragmentary side plan view of a rotor magnet having its north and south poles aligned at skew with respect to the central axis.

Similar to slot 132, the rotor magnet can be magnetized or segmented such that its north and south poles are oriented at skew with respect to the central axis to even further smooth reluctance variations. FIG. 5a is a side plan view of a permanent magnet 138 having its north and south poles N and S magnetized at skew with respect to central axis 134. The poles can have an angular rotation from the top to the bottom of the magnet that is between zero and one slot pitch. Stator lamination skew and rotor magnet skew are discussed in greater detail in S. Prina and C. Taft, *The Design and Analysis of Brushless DC Motors Having Smooth Rotor Back Iron*, Proceedings: Symposium on Incremental Motion Control Systems and Devices, Champaign, Ill. 86–90 (1990), which is hereby incorporated by reference.

Figure 6:
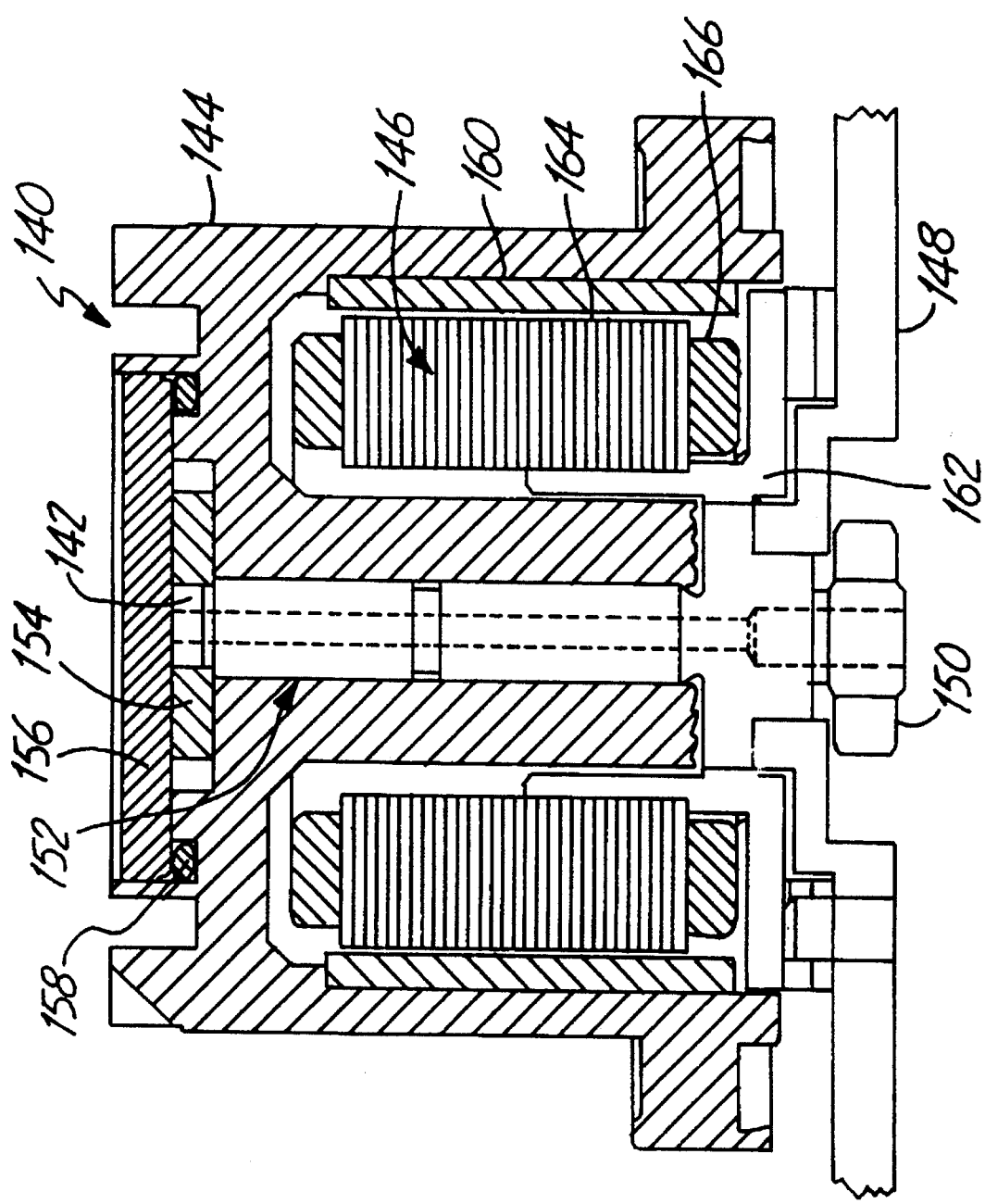
FIG. 6 is a schematic sectional view of a hydrodynamic spindle motor having an alternative stator arrangement in accordance with the present invention.

FIG. 6 is a sectional view of a hydrodynamic bearing spindle motor having an alternative hub and stator arrangement. Hydrodynamic bearing spindle motor 140 includes a stationary shaft 142, a hub 144 and a stator 146. Shaft 142 is attached to base 148 through a nut 150. Hub 144 is interconnected with shaft 142 through a hydrodynamic bearing 152 for rotation about shaft 142.

Spindle motor 140 further includes a thrust bearing 154 and a counterplate 156. An O-ring 158 is provided between counterplate 156 and hub 144 to seal the hydrodynamic bearing 152. Hub 144 carries a permanent magnet 160, which acts as a rotor for spindle motor 140.

Stator 146 is attached to shaft 142 through a snap-ring 162. Stator 146 is formed of a stack of stator laminations 164 and associated stator windings 166. In the embodiment shown in FIG. 6, stator 146 is positioned internal to and coaxial with hub 144.

FIG. 7 is a schematic sectional view of hub 144 and internal stator 146. For simplicity, stator 146 is shown with twelve slots labeled 170–181. In a preferred embodiment, stator 146 includes a much higher number of slots, such as twenty-four or forty-eight. Stator windings 166 include three winding phases, X, Y and Z. Phase X includes phase windings X1 and X2. Phase Y includes phase windings Y1 and Y2. Phase Z includes phase windings Z1 and Z2. Each phase winding is wound in slots 170–181 in a similar fashion as was discussed with reference to FIGS. 3 and 4. Stator laminations 164 operate as a back iron for the phase windings.

It has been found through experiments that hydrodynamic bearing motors are much quieter and in general have lower background vibration levels than motors having ball bearings. Because the background vibration levels are less in a hydrodynamic bearing motor, vibration responses to electromagnetic disturbances become more noticeable since the responses are no longer hidden in the background. Therefore, it is desirable to reduce or eliminate as far as possible the forcing functions that generate pure tone vibrations. The distributed and pitched windings of the present invention provide a more complete solution to reducing the forcing functions in hydrodynamic bearing motors than do the solutions attempted in the prior art.

Although the present invention has been described with reference to preferred embodiments, workers skilled in the art will recognize that changes may be made in form and detail without departing from the spirit and scope of the invention. For example, the distributed and pitched windings of the present invention can be used in fixed shaft or rotating shaft spindle motors. In a rotating shaft spindle motor, the hydrodynamic bearing is located between the rotating shaft and an outer stationary sleeve which is coaxial with the rotating shaft. The stator winding is not limited to the three-phase embodiment shown in FIGS. 3, 4 and 7. The stator winding can have a different number of phases, such as two. In addition, the number of turns per slot and the degree of distribution can be varied to suit a particular application and to minimize space harmonics.

What is claimed is:

1. A disc drive data storage system, comprising:
   a housing;
   a central axis;
   a stationary member which is fixed with respect to the housing and coaxial with the central axis;
   a rotatable member which is rotatable with respect to the stationary member;
   a hydrodynamic bearing interconnecting the rotatable member with the stationary member;
   at least one data storage disc attached to and coaxial with the rotatable member;
   at least one permanent magnet attached to the rotatable member;
   a stator which is coaxial with the rotatable member and which has a circumference;
   a multi-phase stator winding which is attached to the stator and includes a plurality of phase windings, with individual phase windings having a plurality of turns which are distributed about the circumference.

2. The disc drive data storage system of claim 1 wherein the phase windings have a pitch with respect to the circumference which ranges from greater than zero to 180 electrical degrees.

3. The disc drive data storage system of claim 2 wherein the pitch is about 120 electrical degrees.

4. The disc drive data storage system of claim 1 wherein:
   the stator has a plurality of slots positioned about the circumference; and
   individual turns of each phase winding are wound on the stator between non-adjacent slots and the plurality of turns of each phase winding is distributed among adjacent slots.

5. The disc drive data storage system of claim 4 wherein each slot includes turns of more than one phase winding.

6. The disc drive data storage system of claim 4 wherein:
   the multi-phase winding includes two winding layers, with each slot comprising turns of at least two phase windings.

7. The disc drive data storage system of claim 4 wherein the multi-phase winding includes two phases.

8. The disc drive data storage system of claim 4 wherein the multi-phase winding includes three phases.

9. The disc drive data storage system of claim 1 wherein the stator is positioned below the rotatable member.

10. The disc drive data storage system of claim 1 wherein the stator is positioned radially external to the rotatable member.

11. The disc drive data storage system of claim 1 wherein the stator is positioned radially internal to the rotatable member.

12. The disc drive data storage system of claim 1 wherein:
    the stator includes a stack of stator laminations wherein each stator lamination is rotated an incremental angle about the central axis with respect to a preceding lamination in the stack.

13. The disc drive data storage system of claim 1 wherein:
    the permanent magnet has north and south poles which are aligned at skew with respect to the central axis.

14. The disc drive data storage system of claim 1 wherein at least one of the plurality of turns of each phase winding overlaps at least one of the plurality of turns of another of the phase windings.

15. A disc drive data storage system, comprising:
    a housing;
    a central axis;
    a stationary member which is fixed with respect to the housing and coaxial with the central axis;
    a hub;
    a hydrodynamic bearing interconnecting the hub with the stationary member such that the hub is rotatable about the central axis;
    at least one data storage disc attached to and coaxial with the hub;
    at least one rotor magnet attached to the hub;
    a stator which is coaxial with the hub, wherein the stator has a circumference and a plurality of slots positioned about the circumference; and
    a three phase stator winding, with each phase comprising at least one phase winding formed of a plurality of turns, wherein the plurality of turns of each phase is distributed among adjacent slots and has a pitch of about 120 electrical degrees, and wherein at least one of the slots includes turns of more than one phase.

\* \* \* \* \*

UNITED STATES PATENT AND TRADEMARK OFFICE
CERTIFICATE OF CORRECTION

PATENT NO. : 5,590,003
DATED : December 31, 1996
INVENTOR(S) : John C. Dunfield and Gunter K. Heine It is certified that error appears in the above-indentified patent and that said Letters Patent is hereby corrected as shown below:

Title page,

Under [56] References Cited:

Please delete "5,459,005" and insert --5,469,005--.

Signed and Sealed this

First Day of April, 1997

*Attest:*

BRUCE LEHMAN

*Attesting Officer*      *Commissioner of Patents and Trademarks*